US011132560B2

(12) United States Patent
Friedmann et al.

(10) Patent No.: US 11,132,560 B2
(45) Date of Patent: Sep. 28, 2021

(54) METHOD FOR EVALUATING AN OPTICAL APPEARANCE IN THE SURROUNDINGS OF A VEHICLE, AND VEHICLE

(71) Applicant: AUDI AG, Ingolstadt (DE)

(72) Inventors: Felix Friedmann, Eching (DE); Oleksandr Vorobiov, Albstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/643,417

(22) PCT Filed: Sep. 6, 2018

(86) PCT No.: PCT/EP2018/074030
§ 371 (c)(1),
(2) Date: Mar. 27, 2020

(87) PCT Pub. No.: WO2019/048554
PCT Pub. Date: Mar. 14, 2019

(65) Prior Publication Data
US 2020/0257906 A1    Aug. 13, 2020

(30) Foreign Application Priority Data

Sep. 7, 2017   (DE) .......................... 102017215718.6

(51) Int. Cl.
G06K 9/00        (2006.01)
G06T 7/10        (2017.01)
(Continued)

(52) U.S. Cl.
CPC ........... *G06K 9/00791* (2013.01); *G06K 9/46* (2013.01); *G06K 9/628* (2013.01); *G06K 9/6256* (2013.01);
(Continued)

(58) Field of Classification Search
CPC .... G06K 9/00791; G06K 9/46; G06K 9/6256; G06K 9/628; G06K 9/629; G06K 9/00805; G06T 7/10; G06T 2207/30252
(Continued)

(56) References Cited

U.S. PATENT DOCUMENTS 6,141,433 A     10/2000  Moed et al.
7,046,822 B1     5/2006  Knoeppel et al.
(Continued)

FOREIGN PATENT DOCUMENTS

DE        19926559 A1   12/2000
DE     102015007145 A1   12/2016
(Continued)

OTHER PUBLICATIONS

Alexander Kirillov, Evgeny Levinkov, Bjoern Andres, Bogdan Savchynskyy, Carsten Rother: InstanceCut: from Edges to Instances with MultiCut. CoRR abs/1611.08272 (2016) (Year: 2016).*
(Continued)

*Primary Examiner* — Ishrat I Sherali
(74) *Attorney, Agent, or Firm* — Sterne, Kessler, Goldstein & Fox P.L.L.C.

(57) ABSTRACT

The discloser relates to a method for evaluating an optical appearance in the surroundings of a vehicle and to a vehicle. The method has the steps of providing a captured image of the surroundings of a vehicle and extracting features from the captured image. Furthermore, the method comprises carrying out a first analysis of the captured image, wherein one or more objects are detected as surfaces and the result of the analysis is provided as a first analysis result. A second analysis of the captured image is also carried out, wherein edges of one or more objects are detected and the result of the analysis is provided as a second analysis result, the first analysis and the second analysis being carried out indepen-
(Continued)

dently of each other. The method further comprises combining the first analysis result and the second analysis result to form an output image.

10 Claims, 2 Drawing Sheets

(51) Int. Cl.
G06K 9/46 (2006.01)
G06K 9/62 (2006.01)

(52) U.S. Cl.
CPC ...... *G06T 7/10* (2017.01); *G06T 2207/30252* (2013.01)

(58) Field of Classification Search
USPC .......................... 382/104, 159, 173
See application file for complete search history.

(56) References Cited

U.S. PATENT DOCUMENTS

| | | | |
|---|---|---|---|
| 10,229,341 B2* | 3/2019 | Zink | G06N 3/063 |
| 10,664,722 B1* | 5/2020 | Sharma | G06K 9/6256 |
| 10,733,484 B2* | 8/2020 | Shestak | G06K 9/66 |
| 2009/0169052 A1 | 7/2009 | Seki et al. | |
| 2013/0083968 A1 | 4/2013 | Sakamoto | |
| 2014/0010408 A1 | 1/2014 | Irie et al. | |
| 2016/0054452 A1 | 2/2016 | Cosatto et al. | |
| 2017/0132468 A1 | 5/2017 | Mosher et al. | |
| 2019/0051056 A1* | 2/2019 | Chiu | G06T 7/136 |
| 2019/0258251 A1* | 8/2019 | Ditty | G06K 9/00805 |
| 2020/0082198 A1* | 3/2020 | Yao | G06K 9/00986 |
| 2020/0098135 A1* | 3/2020 | Ganjineh | G06T 7/11 |
| 2020/0250439 A1* | 8/2020 | Vig | G06K 9/00798 |
| 2021/0182596 A1* | 6/2021 | Adams | G06K 9/00818 |

FOREIGN PATENT DOCUMENTS

| | | |
|---|---|---|
| EP | 1780675 A1 | 5/2007 |
| JP | 2004310282 A | 11/2004 |

OTHER PUBLICATIONS

Guo et al., Image Semantic Segmentation With Edge and Feature Level Attenuator, 2019, IEEE 978-1-5386-6249-6/19, pp. 2511-2520. (Year: 2019).*
Liu et al., Implementation of Lightweight Semantic Segmentation Algorithm in Road Obstacle Detection, PMCID: PMC7763539, PMID: 33322029, 2020, pp. 1-10 (Year: 2020).*
International Search Report and Written Opinion of the International Searching Authority directed to related International Patent Application No. PCT/EP2018/074030, with attached English-language translation, dated Jan. 7, 2019; 17 pages.
Huang, Yingping et al., "Stereovision-Based Object Segmentation for Automotive Applications" EURASIP Journal on Advances in Signal Processing, vol. 2005, No. 14, Aug. 25, 2005; pp. 2322-2329.
International Preliminary Report on Patentability directed to related International Patent Application No. PCT/EP2018/074030, completed Aug. 16, 2019, with attached English-language translation; 14 pages.

* cited by examiner

METHOD FOR EVALUATING AN OPTICAL APPEARANCE IN THE SURROUNDINGS OF A VEHICLE, AND VEHICLE

TECHNICAL FIELD

The present disclosure relates to the field of automotive technology; in particular the present disclosure relates to a method for evaluating an optical appearance in the surroundings of a vehicle and to a vehicle.

BACKGROUND

DE 10 2015 007 145 A1 describes a method for automatic route evaluation in which an optical appearance of a route is evaluated with respect to a subjective emotional attractiveness criterion. Machine learning, in particular by means of deep neural networks, automatically extracts values for attractiveness criteria, such as scenic beauty, architectural beauty, remoteness, for each image in the video signal from collected video recordings.

From U.S. Pat. No. 6,141,433 A, a system and a method for extracting image information from a video frame for regions of the video frame are known which are likely to be objects of interest in a scene.

A vehicle peripheral monitoring device is known from US 2013/0083968 A1 that detects an object present outside a vehicle using an in-vehicle camera.

An object detection apparatus for detecting a peripheral object based on a recorded image is known from US 2009/0169052 A1.

US 2014/0010408 A1 discloses a detector for lens-attached matter which detects matter attached to a lens of a camera.

Furthermore, automated detection of objects in the vicinity of a vehicle is a prerequisite for piloted and automatic driving of a vehicle. A camera provides image data or data streams that are evaluated inside the vehicle or in an external evaluation unit outside the vehicle. The evaluation is done in real time if possible so that the vehicle can react to the particular traffic situation.

During the analysis of the captured image, so-called object classes are processed, separate object classes being created for different objects. Accordingly, the object classes "motor vehicle," "commercial vehicle," "two-wheeler," "pedestrian," "street" and "other obstacles," to name a few examples, are used in image processing. In order to detect object classes in image data, methods for semantic segmentation or object recognition are currently being used.

In the semantic segmentation method, each pixel in the image is assigned an object class. This creates a precise spatial division between the object classes in the image. A disadvantage of semantic segmentation is that only image regions that correspond to the object class are detected, but no individual objects can be distinguished from each other. This is particularly the case when objects of an object class are adjacent to each other in the captured image.

In the method of object recognition, objects in the captured image are detected directly at their respective positions. A disadvantage of object recognition is that the detection is carried out for rectangular image regions. Therefore, no precise spatial assignment can be made, especially with complex contours and "overhanging" objects or overlapping objects in a perspective view.

A method in which both objects and delimited surfaces are clearly detected, i.e. objects with their exact contours can be detected, is referred to as "instance segmentation."

Previously known methods for instance segmentation are often solved by the combination of various complex and computationally complex methods, for example by a combination of deep neural networks for object recognition and deep neural networks for semantic segmentation. Examples of this are the so-called "deep watershed transformation," "instance-aware semantic segmentation via multi-task network cascades" and other complicated and computational methods. Due to the high demands on computing power with these methods, use in vehicles, for example for driver assistance systems and autonomous driving, is difficult, especially since real time requirements have to be met and a plurality of camera data streams have to be processed. Furthermore, the previously known methods are not very flexible due to their complexity and are also prone to errors.

DETAILED DESCRIPTION

Figure 1:
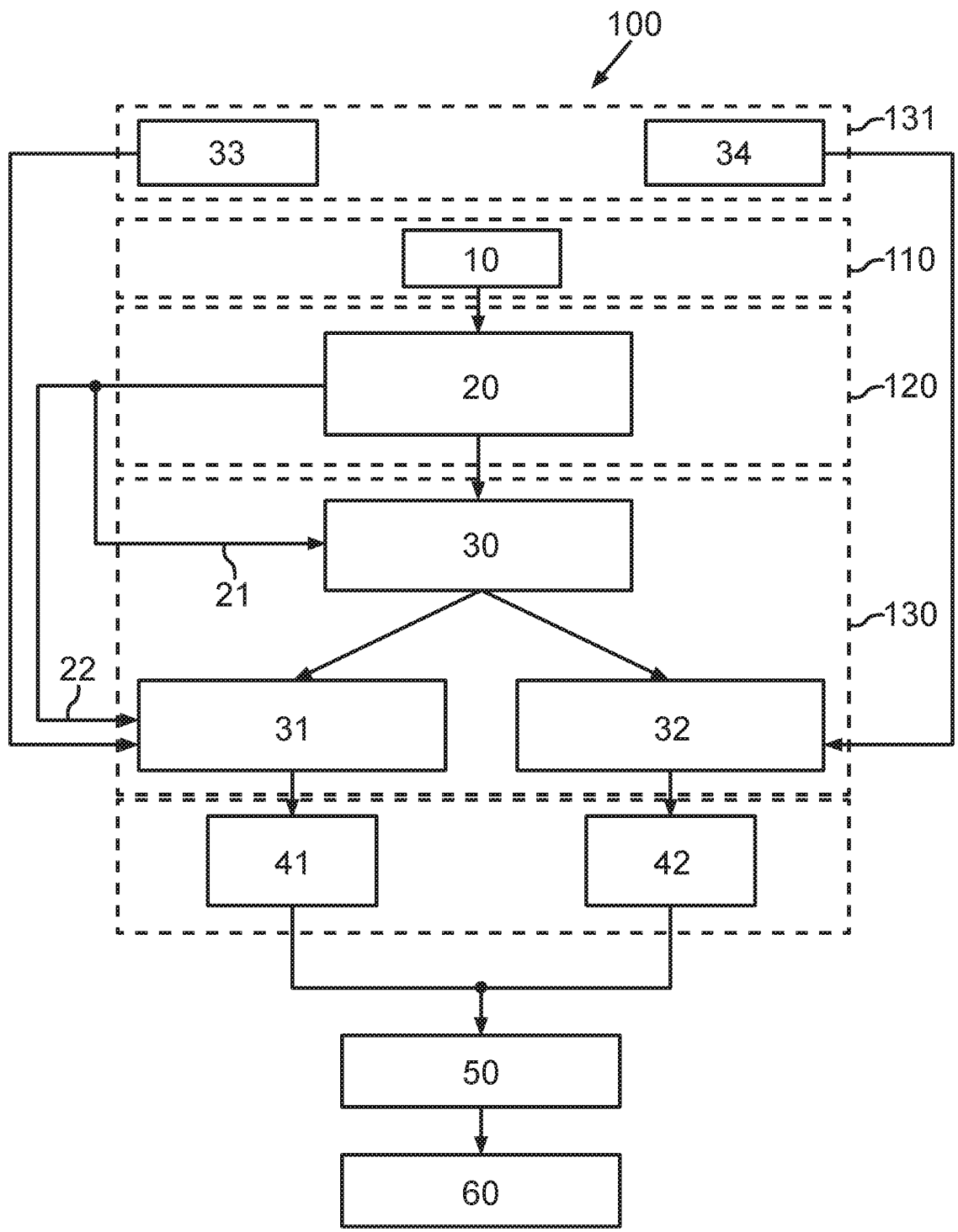
FIG. 1 shows a schematic representation of an exemplary embodiment of a method according to the disclosure.

The present disclosure relates to the field of automotive technology; in particular the present disclosure relates to a method for evaluating an optical appearance in the surroundings of a vehicle and to a vehicle.

DE 10 2015 007 145 A1 describes a method for automatic route evaluation in which an optical appearance of a route is evaluated with respect to a subjective emotional attractiveness criterion. Machine learning, in particular by means of deep neural networks, automatically extracts values for attractiveness criteria, such as scenic beauty, architectural beauty, remoteness, for each image in the video signal from collected video recordings.

From U.S. Pat. No. 6,141,433 A, a system and a method for extracting image information from a video frame for regions of the video frame are known which are likely to be objects of interest in a scene.

A vehicle peripheral monitoring device is known from US 2013/0083968 A1 that detects an object present outside a vehicle using an in-vehicle camera.

An object detection apparatus for detecting a peripheral object based on a recorded image is known from US 2009/0169052 A1.

US 2014/0010408 A1 discloses a detector for lens-attached matter which detects matter attached to a lens of a camera.

Furthermore, automated detection of objects in the vicinity of a vehicle is a prerequisite for piloted and automatic driving of a vehicle. A camera provides image data or data streams that are evaluated inside the vehicle or in an external evaluation unit outside the vehicle. The evaluation is done in real time if possible so that the vehicle can react to the particular traffic situation.

During the analysis of the captured image, so-called object classes are processed, separate object classes being created for different objects. Accordingly, the object classes "motor vehicle," "commercial vehicle," "two-wheeler," "pedestrian," "street" and "other obstacles," to name a few examples, are used in image processing. In order to detect object classes in image data, methods for semantic segmentation or object recognition are currently being used.

In the semantic segmentation method, each pixel in the image is assigned an object class. This creates a precise spatial division between the object classes in the image. A disadvantage of semantic segmentation is that only image regions that correspond to the object class are detected, but no individual objects can be distinguished from each other. This is particularly the case when objects of an object class are adjacent to each other in the captured image.

In the method of object recognition, objects in the captured image are detected directly at their respective positions. A disadvantage of object recognition is that the detection is carried out for rectangular image regions. Therefore, no precise spatial assignment can be made, especially with complex contours and "overhanging" objects or overlapping objects in a perspective view.

A method in which both objects and delimited surfaces are clearly detected, i.e. objects with their exact contours can be detected, is referred to as "instance segmentation."

Previously known methods for instance segmentation are often solved by the combination of various complex and computationally complex methods, for example by a combination of deep neural networks for object recognition and deep neural networks for semantic segmentation. Examples of this are the so-called "deep watershed transformation," "instance-aware semantic segmentation via multi-task network cascades" and other complicated and computational methods. Due to the high demands on computing power with these methods, use in vehicles, for example for driver assistance systems and autonomous driving, is difficult, especially since real time requirements have to be met and a plurality of camera data streams have to be processed. Furthermore, the previously known methods are not very flexible due to their complexity and are also prone to errors.

The task is therefore to overcome the existing disadvantages, in particular an improved method for instance segmentation is to be provided.

This object is achieved with a multi-layered speaker cover according to claim 1 and a vehicle according to claim 10. Further embodiments can be found in the dependent claims.

A method according to the disclosure for evaluating an optical appearance in the surroundings of a vehicle is proposed. The method comprises providing a captured image of the surroundings of a vehicle and extracting features from the captured image. The method further comprises carrying out a first analysis of the captured image, one or more objects being detected as surfaces and the result of the analysis being provided as the first analysis result. Furthermore, the method comprises carrying out a second analysis of the captured image, edges of one or more objects being detected and the result of the analysis being provided as a second analysis result. It is provided here that the first analysis and the second analysis are carried out independently of each other. Furthermore, the method has a combination of the first analysis result and the second analysis result in which the detected edges from the second analysis result are excluded on the surfaces of the detected objects from the first analysis result.

The image capture used can be captured with a camera installed in or on a vehicle. In this case, the image capture can be a single image of an image sequence which is recorded continuously as video data, for example. It is also possible with the proposed method to analyze a plurality of captured images in parallel, for example when capturing a plurality of simultaneous recordings from a plurality of cameras on or in the vehicle. Accordingly, analysis devices are provided which are each assigned to a camera.

The provided captured image supplies image data that are analyzed. An extraction of features of the captured image includes, for example, the division of the image data into a plurality of folding layers.

In the proposed method, the first analysis can be carried out as semantic segmentation with a first analysis device. The second analysis can be carried out as edge detection with a second analysis device. The combination of the first analysis with the second analysis can be understood as instance segmentation, in which objects with their contours are detected, adjacent objects (vehicles, pedestrians, cyclists, road markings, etc.) being distinguishable from each other. The objects are defined in so-called object classes and can be used as training data for analyzing the captured image. Overall, closed surfaces are detected on the captured image and assigned to individual objects.

With the proposed method, it is thus possible to distinguish adjacent objects of the same object class from each other, for example the distinction between two vehicles traveling behind each other which partially overlap each other in the captured image in a two-dimensional view.

In a preferred exemplary embodiment of the method, it can be provided that the first analysis and the second analysis are carried out in a common deep neural network.

Accordingly, a method for generating a single deep neural network for instance segmentation is proposed. This embodiment has the advantage that no different neural networks need to be coordinated with each other, since a common network is used. Here, the neural network can have an encoder and a decoder, the decoder having a first strand for semantic segmentation and a second strand for edge detection.

The folding layers of the extraction of features from the image analysis can be provided in a "convolutional neural network" (CNN) or a "folding neural network." A convolutional neural network is an artificial neural network that can be used for pattern and image recognition. Accordingly, the encoder and decoder used can be understood as a convolutional encoder or as a convolutional decoder.

In a further embodiment of the method, it can be provided that the first analysis is based on first training data and that the first training data have class classifications.

A classification or a label means a class affiliation for the training data in machine learning. Accordingly, a class classification or a class label means training data that can be used for the first analysis.

In a further exemplary embodiment of the method, it can be provided that the second analysis is based on second training data and that the second training data have contour classifications.

Contour classifications or contour labels mean data that can be used as stored training data for the second analysis.

Furthermore, it can advantageously be provided that the first analysis device and the second analysis device are part of a decoder which is divided into two threads.

A decoder is to be understood as a device that can process data in order to decrypt or decode it. In the present method, analysis data of the first analysis and the second analysis are combined with the decoder in order to obtain an overall analysis result. The overall analysis result here is an analyzed captured image in the surroundings of a vehicle in which individual objects can be distinguished from each other, in particular if objects overlap or adjoin each other in the captured image.

In a further embodiment, it can be provided that the first analysis and the second analysis are carried out in parallel. This leads to particularly fast processing of the image data and to the shortest possible response times, which are particularly advantageous with the automatic driving of vehicles.

In a further embodiment of the method, it can be provided that when the first analysis result is combined with the second analysis result, a closed surface or a plurality of closed surfaces are provided, each closed surface presenting an object.

Accordingly, each individual object can advantageously be detected automatically. The closed surface is advantageously provided visually to a navigation system and/or used for further processing.

In a further embodiment of the method, it can be provided that a unique identification is assigned to each closed surface.

The assignment of a clear identification, for example by means of a color or a numerical code, enables further processing of the image data, for example for tracking the surroundings of the vehicle.

Furthermore, it can advantageously be provided that the method further comprises assigning a fingerprint for each closed surface and comparing the fingerprint to image data recorded earlier in time.

With the use of a fingerprint for a detected object that presents itself as a closed surface, tracking and matching can be carried out. The fingerprint links properties such as color, speed and direction of travel of a detected object, for example a vehicle.

Furthermore, the object of the disclosure is achieved by a vehicle. For this purpose, the vehicle has a camera for providing a captured image of the surroundings of a vehicle, a first analysis device and a second analysis device for carrying out the method according to the disclosure.

The method according to the disclosure for evaluating an optical appearance in the surroundings of a vehicle is real-time capable and is therefore particularly suitable for automated driving of vehicles. The vehicle according to the disclosure can be used for piloted or autonomous driving in which individual objects in the surroundings of the vehicle are detected quickly and reliably.

The principle of the present disclosure will now be explained in more detail with reference to an exemplary embodiment in the accompanying drawings. The exemplary embodiments shown can also be combined with each other as desired.

FIG. 1 shows a schematic representation of an exemplary embodiment of a method according to the disclosure.

Figure 2:
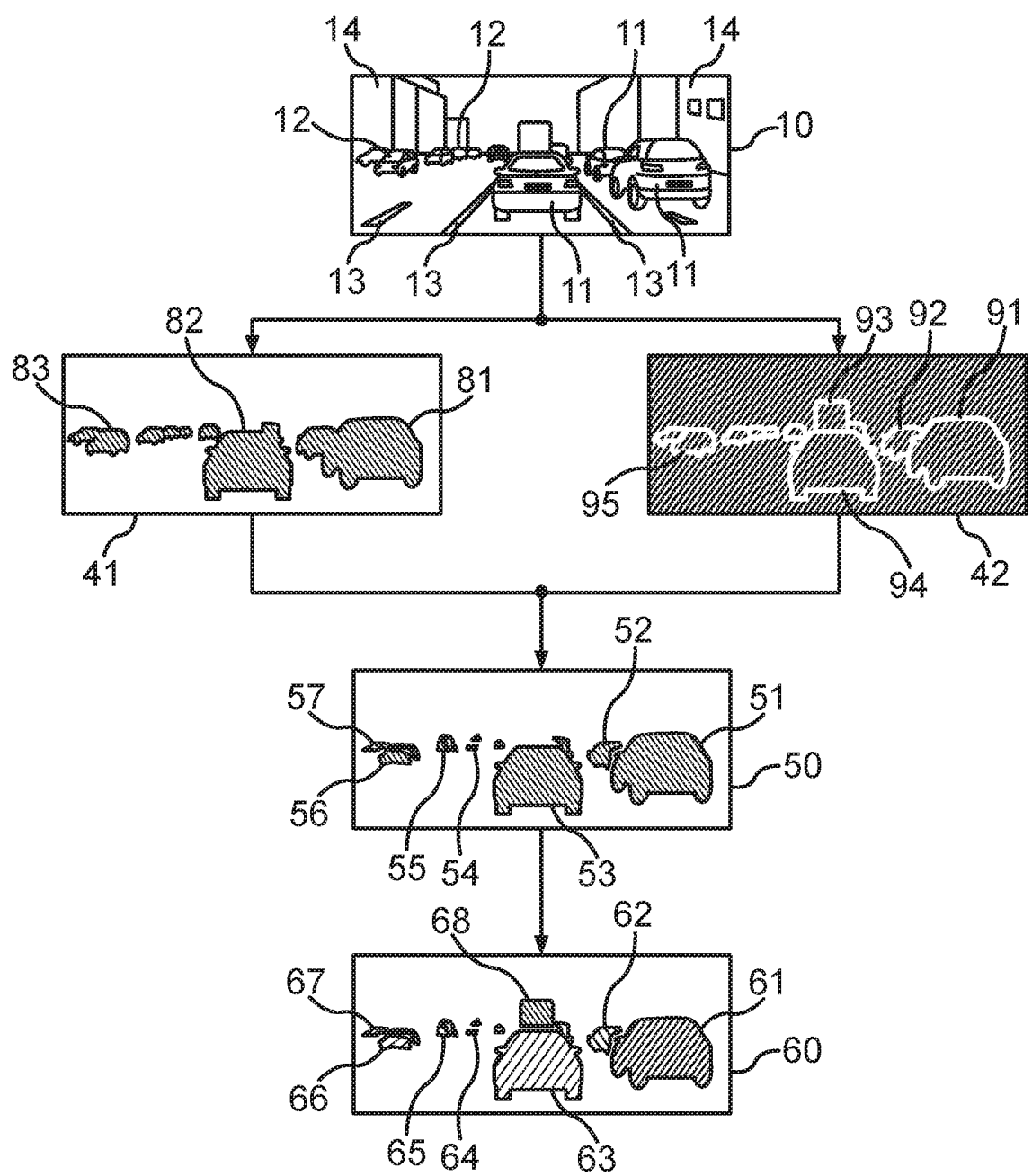
FIG. 2 shows individual image analyses from the inventive method according to FIG. 1.

FIG. 2 shows individual image analyses from the inventive method according to FIG. 1.

FIG. 1 shows a schematic illustration of an exemplary embodiment of the method 100 according to the disclosure. A captured image 10 of the surroundings of a vehicle is provided as an input image from a camera 110 installed in or on a vehicle. The captured image 10 is fed to an encoder 120, which processes the input image 10 further, so that a first analyzed image 20 is produced. For this purpose, the decoder extracts features from the input image 10. This happens, for example, with folding layers. These folding layers can be folding layers built up several times in succession. The folding layers can have different functions, such as a folding function, pooling and/or activation functions.

The image data as a first analyzed image 20 of the encoder 120 are fed to a decoder 130 as output data 30. The decoder 130 has a plurality of functions for analyzing the supplied image data. On the one hand, it carries out a first analysis 31 as semantic segmentation and, in addition, it performs edge detection as a second analysis 32. In addition, class classifications 33 or class labels 33 for semantic segmentation and contour classifications 34 or contour labels 34 for edge detection can be used in the image analysis. The class labels 33 and the edge labels 34 were previously obtained from training data and were each stored in a data memory 131 for training data.

An input image 10 is captured with a camera 110, and features of the input image 10 are extracted with an encoder 110. The extraction can have a plurality of folding layers built one after the other. The extraction is done, for example, by a combination of folding, pooling and activation functions. The convolution layers are then processed with a decoder 120 and can include deconvolution, upsampling and/or activation functions. FIG. 1 shows optional operative connections 21, 22, so that the folding layers of the encoder 110 can optionally be supplied to the decoder 120 and/or to the first analysis 31 with semantic segmentation.

The two analyses 31, 32 of the decoder 130 can be carried out temporally in parallel, since the decoder 130 has two processing threads. The result of the first analysis 31 is made available by the decoder 130 as a first analysis image 41. The result of the second analysis 32 is also made available by the decoder 130 as a second analysis image 42. The two analysis images 41, 42 can then be combined with each other in a further processing phase, so that an output image 50 results. In this case, the detected edges from the second analysis result are excluded on each detected object from the first analysis result. The result is then a processed image 50 with detected objects and detected edges, the edges separating individual objects from each other. Furthermore, object identification can be carried out on the basis of the output image 50, so that an object-related output image 60 results. In this case, image regions belonging together are detected from the image 50 and assigned their own identification, for example. The identification can be used, for example, to observe individual objects more closely or to take them into account over time. For example, a so-called fingerprint can be used for each individual object. If the corresponding object moves as a function of time, it can be detected again by detecting that the fingerprint matches.

FIG. 2 shows a further exemplary embodiment of the method 100 according to the disclosure for further explanation of the individual image analyses from the method 100 from FIG. 1.

FIG. 2 shows an output image 10 as a photograph which was recorded by a camera 110 in the vicinity of a vehicle. The output image 10 shows a plurality of vehicles 11 traveling ahead, a large number of oncoming vehicles 12, road markings 13 and a plurality of buildings 14. Two analysis images 41, 42 are obtained from the output image 10 by carrying out a semantic segmentation and edge detection on the basis of the output image 10.

The result of the semantic segmentation shows, as analysis image 41, flat objects which represent vehicles, the individual vehicles not being shown separately from each other. Accordingly, three separate surfaces 81, 82, 83 are formed, each surface representing a plurality of vehicles.

The result of the edge separation shows, as analysis image 42, individual closed lines 91, 92, 93, 94, 95, each of which represents a vehicle; further closed lines were not further designated in image 42 of FIG. 2.

A combination of the analyzed image data from image 41 and image 42 results in image 50, wherein the edges of the edge detection in image 42 are excluded from the segmentation result of image 41 for this purpose. In FIG. 50, the previously detected vehicle surfaces 81, 82, 82 have each been subdivided again, so that individual vehicles 51-57 now emerge from the vehicle surfaces 81, 82, 82 and are visibly separated from each other by the edges (further detected vehicles were not marked in FIG. 2). The now isolated vehicle surfaces are separated from neighboring vehicle surfaces by clear outlines.

In FIG. 60 of FIG. 2, different identifications are assigned to the respectively detected vehicles, so that a fingerprint results for each vehicle. A fingerprint combines recorded and analyzed data of a vehicle, such as outline or silhouette, direction of travel, size of the vehicle, type of vehicle and speed of the vehicle. In a subsequent image capture, the fingerprint created is compared to a newly created fingerprint of the second captured image. If there is a match between the two fingerprints, the previously detected object of the first captured image is identified as the detected object in the second captured image.

The exemplary embodiments shown in FIGS. 1 and 2 can be implemented using a neural network having at least two levels, i.e. a deep neural network. Training data are prepared and class labels and contour labels are made available.

Instead of a complex design consisting of a plurality of deep neural networks or other computationally complex processes, a single deep neural network is generated by training with specially prepared training data. The training data are advantageously composed of two levels, namely a first level with the class labels and a second level for the contour labels. In the second level for the contour labels, for example, contours can only be contained for the classes from which instances are to be detected later (e.g. road users).

The deep neural network can be used for semantic segmentation, object recognition and instance segmentation in order to achieve significantly improved results compared to conventional methods. The term "deep neural networks" is understood to mean a multilayer neural network, i.e. a neural network with at least two layers.

The architecture of the deep neural network suitable for the method according to the disclosure has a decoder. The decoder combines features and displays them on the image region. The decoder is divided into two threads: A first strand for semantic segmentation and a second strand for edge detection.

Although in principle edge detection can be achieved using conventional methods (e.g. Sobel, Lablace, Canny), any edges in the image would then be detected, in particular also edges within the instances, which would make further processing pointless. If the edge detection is learned through the deep neural network, the fully trained network is able to actually extract only the contours of the objects.

The deep neural network is trained both with the class labels of semantic segmentation and with the contour labels of edge detection. An error value (loss) is generated for both threads between the current results of the network in training ("forward pass") and the label and propagated back for training the network ("back propagation").

The extraction of instances takes place in the proposed deep neural network. To segment instances, an input image 10 is processed through the deep neural network. As a result, the deep neural network outputs semantic segmentation and the detected edges. The edges are excluded from the segmentation result, whereby the individual instances are no longer connected. For this result, each closed surface is assigned a unique ID, which can be used to reference the mask for this region (this instance).

Furthermore, fingerprinting, i.e. the use of fingerprints, and tracking, the tracking of moving objects, can be provided by using a deep neural network. For this purpose, the extracted instances can be tracked efficiently over time for deeper analysis by using a fingerprint for each instance in each image. For the fingerprint, a plurality of features, for example size, position, histogram, etc., are extracted for an instance segment and are compared to existing fingerprints from previous images. If there is a match, the two fingerprints are combined to form a new fingerprint, which results in an adaptation. Old fingerprints that have not been matched for a long time are discarded. For the correspondence found by means of a fingerprint match, it is assumed that it is the same object that was detected over time (=over a plurality of images) by the particular vehicle. A more in-depth analysis can then be carried out for the detected objects.

The use of a deep neural network in a vehicle can be configured as follows:

One possible system has a back-end environment for training the deep neural network and also vehicles on which the deep neural network is implemented. The vehicles are equipped, for example, with one or more cameras 110 for recording the surroundings and special hardware for accelerated execution of the neural network, such as GPU (graphics processor), FPGA (field programmable gate array) or special hardware (TPU (tensor processor), ASIC (application-specific integrated circuit) or DSP (digital signal processor)).

Here, with the aid of special labeled training data, a deep neural network is trained to perform semantic segmentation 31 and edge detection 32 for an input image 10. After completing the training, the neural network is used on a control unit of a vehicle for processing vehicle camera data. On the control unit, an instance segmentation is obtained from the results of the network (semantic segmentation and edge detection) using special methods. With the help of fingerprinting, extracted instances, in particular vehicles, are tracked over time.

The following advantages result in particular:

The method according to the disclosure can be used as a basis for piloted and autonomous driving. The detection and tracking of objects in the surroundings of the vehicle are a basis for piloted and autonomous driving.

The described method for instance segmentation enables a significantly higher quality in the perception of the surroundings to be achieved compared to other methods. By means of the method according to the disclosure, cross traffic can be detected and tracked without problems, for example. This increases the quality of the perception of the surroundings.

The edge detection and the extraction of the instances cause hardly any computational effort compared to the semantic segmentation. The semantic segmentation by the described deep neural network has a constant runtime and is also real-time capable with regard to the runtime. Accordingly, the efficiency in image processing is increased.

The method according to the disclosure can be used for instance segmentation. With appropriate implementation, the method according to the disclosure has a constant runtime and is therefore suitable for real time data processing, in particular for real time data processing in the vehicle. For fingerprinting and tracking, implementation with a constant runtime is possible.

Overall, a particularly efficient method for pixel-precise classification of camera data with object recognition and instance segmentation is provided.

The invention claimed is:

1. A method for evaluating an optical appearance of surroundings of a vehicle, the method comprising:

capturing, by a camera of the vehicle, a captured image of the surroundings of the vehicle;

extracting, by a decoder of the vehicle, features from the captured image;

performing, based on results of the extracting the features, and by a first analysis device of the vehicle, a first analysis of the captured image by detecting one or more objects of an object class as surfaces in the captured image, wherein the first analysis is implemented as a semantic segmentation, wherein the one or more objects overlap or adjoin each other in the captured image, and wherein a result of the first analysis is a first analysis result;

performing, based on the results of the extracting the features, and by a second analysis device of the vehicle, a second analysis of the captured image by detecting edges of the one or more objects, wherein a result of the second analysis is a second analysis result; and combining, by the decoder, the first analysis result and the second analysis result to form an output image by excluding the edges from the surfaces of the one or more objects, wherein the one or more objects of the object class emerge from the surfaces and are visibly separated from each other by the edges;

wherein the first analysis and the second analysis are carried out independently of each other.

2. The method of claim 1, wherein the performing the first analysis and the performing the second analysis include using a single deep neural network.

3. The method of claim 1, wherein the performing the first analysis includes using first training data, wherein the first training data have class classifications.

4. The method of claim 1, wherein the performing the second analysis includes using second training data, wherein the second training data have contour classifications.

5. The method of claim 1, wherein the decoder is divided into two threads, and comprises the first analysis device and the second analysis device.

6. The method of claim 1, wherein the performing the first analysis and the performing the second analysis are carried out temporally in parallel.

7. The method of claim 1, wherein the output image comprises a closed surface or a plurality of closed surfaces, and each closed surface represents one of the one or more objects of the object class.

8. The method of claim 7 further comprising assigning a unique identification for each closed surface.

9. The method of claim 7 further comprising:

assigning a fingerprint for each closed surface; and comparing the fingerprint to previously recorded image data.

10. A vehicle comprising a camera for providing a captured image of surroundings of a vehicle, a first analysis device, a second analysis device, and a decoder, wherein the vehicle is configured to:

capture, by the camera, the captured image of the surroundings of the vehicle;

extract, by the decoder, features from the captured image;

perform, based on results of the extracting the features, and by the first analysis device, a first analysis of the captured image by detecting one or more objects of an object class as surfaces in the captured image, wherein the first analysis is implemented as a semantic segmentation, wherein the one or more objects overlap or adjoin each other in the captured image, and wherein a result of the first analysis is a first analysis result;

perform, based on the results of the extracting the features, and by the second analysis device, a second analysis of the captured image by detecting edges of the one or more objects, wherein a result of the second analysis is a second analysis result; and combine, by the decoder, the first analysis result and the second analysis result to form an output image by excluding the edges from the surfaces of the one or more objects, wherein the one or more objects of the object class emerge from the surfaces and are visibly separated from each other by the edges;

wherein the first analysis and the second analysis are carried out independently of each other.

* * * * *